Oct. 25, 1932.  K. C. RANDALL  1,884,225

DISTRIBUTING PANEL

Filed Feb. 15, 1929

INVENTOR
Karl C. Randall.
BY
ATTORNEY

Patented Oct. 25, 1932

1,884,225

UNITED STATES PATENT OFFICE

KARL C. RANDALL, OF EDGEWOOD, PENNSYLVANIA, ASSIGNOR TO WESTINGHOUSE ELECTRIC & MANUFACTURING COMPANY, A CORPORATION OF PENNSYLVANIA

DISTRIBUTING PANEL

Application filed February 15, 1929. Serial No. 340,308.

My invention relates to distributing panels and particularly to enclosed panels for containing branch circuit controlling devices used in house wiring and light and small power circuits.

An object of my invention is to provide a distributing panel wherein each current controlling device for a branch line circuit is enclosed within a housing comprising a base upon which the feed conductor is mounted, a secondary base upon which the current controlling device is mounted having a contact that engages the feed conductor or bus bar when in assembled position thereon, and a cover that encloses the current controlling device and which is provided with a fastening device that is attached to the cover and the first mentioned base and which serves to retain the bases and the cover in assembled relation.

A further object of my invention is to provide a distributing panel having the above-noted characteristics wherein the base units which carry the feed conductor or bus bar are connected in side-by-side relation by supporting strips in such manner that the base units may be inserted within or withdrawn from the housing as a unit.

A further object of my invention is to provide a distributing panel wherein the panel units are sealed in assembled relation by means of a clamping screw that extends through the cover and the secondary base and which is threaded into a threaded socket and molded into the insulating material constituting the base for supporting the bus bar.

Figure 1:
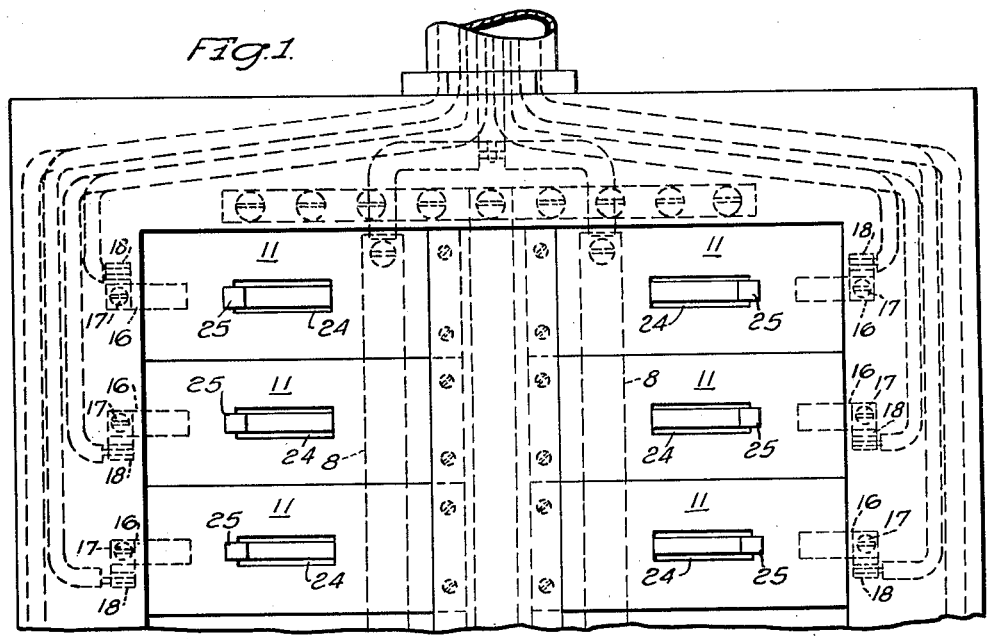
Figure 2:
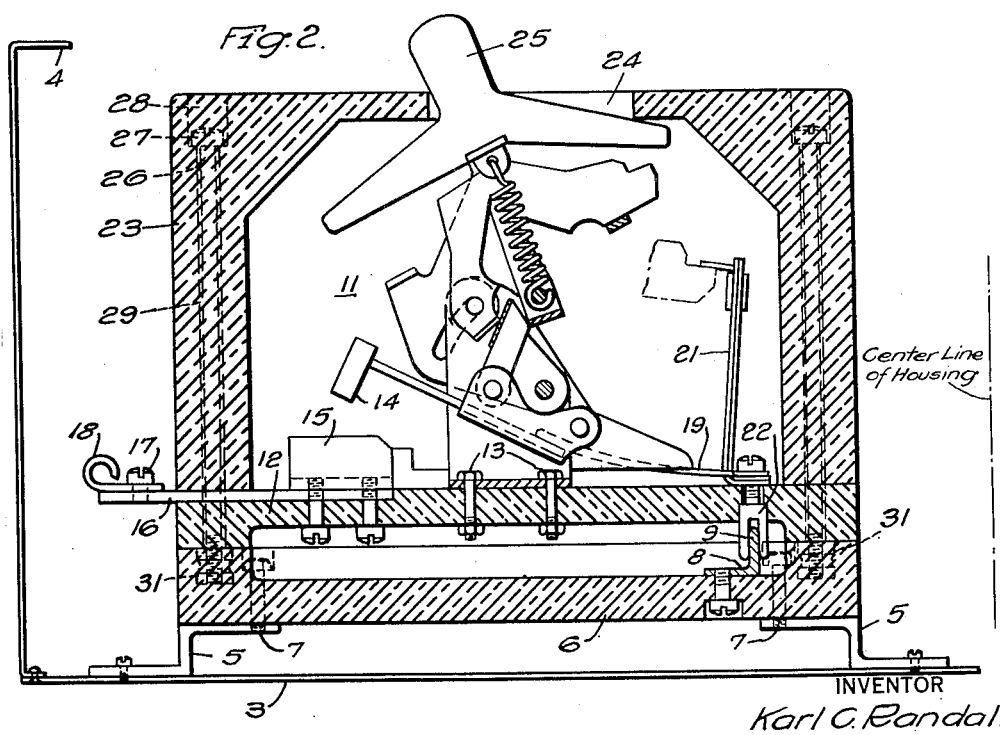

These and other objects that will be made apparent throughout the further description of my invention are obtained by means of the apparatus hereinafter described and illustrated in the accompanying drawing wherein:

Figure 1 is a plan view of a portion of a distributing panel embodying features of my invention, and Fig. 2 is a longitudinal section through a panel unit showing the circuit breaker or a current controlling device in elevation.

Referring to the drawing, the distributing panel comprises a housing 3 of the usual type made of sheet metal and having the side walls provided with inwardly turned flanges 4 for receiving the usual panel trim or cover. The trim is not shown in the drawing as this construction is well known in the art. Within the housing are a plurality of Z-bars 5 that are detachably connected to the bottom of the housing and which serve to support a plurality of panel base units 6 that are attached to the Z-bars by means of screws 7. The base units 6 are assembled upon the Z-bars in side-by-side relation and may then be placed in the housing where they are secured to the bottom wall thereof by preferred attaching means. A feed bus bar 8 of angle cross section is mounted upon each row of base units and is provided with an outwardly turned flange 9, the purpose of which will hereinafter appear.

Each circuit breaker or current controlling unit 11, may be of any preferred form, the circuit breaker shown being of the type disclosed in Patent No. 1,786,797 issued December 30, 1930 to Fred G. Von Hooran and assigned to the Westinghouse Electric & Manufacturing Company. Since no claim is made to the specific form of circuit breaker, a detailed description thereof is not given herein.

The circuit breaker 11, however, includes a secondary base unit 12 of molded insulating material that is adapted to be superimposed upon the base unit 6 and corresponds therewith in shape and size. The circuit breaker 11 is attached to the base 12 by means of screws 13 and is provided with a movable contact 14 that engages a fixed contact 15 that is conductively connected to a terminal strip 16 that extends beyond the end of the base 12 and is provided with a terminal screw 17 for securing a branch line conductor 18 thereto. The contact 14 is provided with a flexible connector 19 that is conductively connected to one leg of the bimetal current responsive element 21 which is of U-shape, the other leg thereof being connected to a contact jaw 22 that extends through the base 12 and which constitutes a slip connection that yieldingly engages the flange 9 of the bus bar when the base 12 is in assembled position on the base 6.

A cover 23 preferably made of molded insulating compound is mounted upon the base 12 and is provided with an opening 24 through which the operating handle 25 of the circuit breaker 11 extends. In order to provide a simple means for sealing the cover and the base 12 in assembled position upon the base 6, I have provided screws 26 having enlarged heads 27 that are disposed in recesses 28 in the outer face of the cover, the screws extending through holes 29 in the cover and the base 12 and projecting into threaded metal inserts 31 that are embedded in the molded composition constituting the base 6 as indicated in Fig. 2. It will be seen that the screws 26 serve to hold the bases and the cover in assembled position and the cover may be sealed in assembled closed position by pouring sealing wax into the recesses 28.

By reason of this construction, it will not be possible for an unauthorized person to gain access to the circuit breaker parts within the cover or to remove the circuit breaker from the panel. This is of particular importance, because the manufacturer can guarantee the operation of the circuit breaker so long as the seal covering the attaching screw is not broken.

Another reason why it is desirable to seal the cover is to prevent unauthorized persons from gaining access to the circuit breaker and tampering with the calibration of the bimetal thermal element 21 which serves to releasably retain the contact 14 in engagement with the contact 15 during normal operation but which releases the contact 14 to open position upon an overload or short circuit condition existing in the branch line circuit. The construction is simple and enables the assembly of the circuit breaker units before they are placed within the panel housing.

While I have illustrated but one embodiment of my invention, it will be apparent to those skilled in the art that various changes, modifications, substitutions, additions and omissions may be made in the apparatus illustrated without departing from the spirit and scope of my invention as set forth in the appended claims.

I claim as my invention:

1. A mounting for a current-controlling device comprising an insulating base having a threaded screw receiving socket therein and a feed conductor mounted on the outer side thereof, a secondary insulating base for supporting the current controlling device on the outer side thereof and having a contact member on the other side thereof and connected to the said device for conductively engaging the said feed conductor with a slip connection when the secondary base is in operative position on the first base, a cover for enclosing the current controlling device mounted upon the secondary base and a fastening screw extending through the cover and the secondary base and engaging the said socket for retaining the bases and cover in assembled position.

2. A mounting for a current-controlling device comprising an insulating base having a threaded screw receiving socket therein and a feed conductor mounted on the outer side thereof, a secondary insulating base for supporting the current controlling device on the outer side thereof and having a contact member on the other side thereof and connected to the said device for conductively engaging the said feed conductor with a slip connection when the secondary base is in operative position on the first base, a cover for enclosing the current controlling device mounted upon the secondary base and a sealable fastening screw extending through the cover and the secondary base and engaging the said socket for retaining the bases and cover in assembled position.

3. A mounting for a current controlling device comprising a base having a feeding conductor mounted on the outer side thereof, a secondary base for supporting the current controlling device on the outer side thereof and having a contact member on the other side thereof and connected to the said device for conductively engaging the feed conductor with a slip connection when the secondary base is in operative position on the first base, a cover for enclosing the current controlling device mounted upon the secondary base and a fastening device extending through the cover and the secondary bases and attached to the first said base for retaining the base and cover in assembled relation.

4. A distributing panel comprising a support, a plurality of base units mounted on the support in side-by-side relation, a bus bar mounted upon the units and extending transversely thereof, secondary base units superimposed on the first base units for supporting branch line current controlling devices and having contacts connected thereto extending from the inner side of the secondary base units for conductively engaging the said bus bar with a slip connection when the secondary base units are in operative position, and a cover for the said device mounted upon the secondary base unit and a fastening means for each cover attached to the cover and its respective first base unit for retaining the base units and the cover in assembled position.

In testimony whereof, I have hereunto subscribed my name this 12th day of February, 1929.

KARL C. RANDALL.